United States Patent [19]
Vermeer

[11] 3,722,197
[45] Mar. 27, 1973

[54] METHOD AND MACHINE FOR FORMING A LARGE ROUND BALE OF A FIBROUS MATERIAL

[76] Inventor: Gary J. Vermeer, P.O. Box 200, Pella, Iowa 50219

[22] Filed: Jan. 3, 1972

[21] Appl. No.: 214,833

[52] U.S. Cl. ................................. 56/341, 100/88
[51] Int. Cl. ........................................ A01d 39/00
[58] Field of Search ........ 56/341, 342, 343; 100/1, 2, 100/35, 76, 88, 89, 5

[56] References Cited

UNITED STATES PATENTS

| | | | |
|---|---|---|---|
| 2,096,990 | 10/1937 | Luebben | 100/88 |
| 2,336,491 | 12/1943 | Luebben | 100/5 |
| 2,581,542 | 1/1952 | Kolzing | 56/343 |
| 798,969 | 9/1905 | Luebben | 100/71 |
| 2,627,223 | 2/1953 | Berge | 100/88 X |

OTHER PUBLICATIONS

"New Roto–Baler Built by Allis–Chalmers," Pages 1, 2, 6, 7, 9 and The Book Cover Page.

Primary Examiner—Russell R. Kinsey
Attorney—Rudolph L. Lowell

[57] ABSTRACT

The method and machine is for forming large round bales about 7 feet in diameter, 6 feet long and weighing about a ton and a half. The machine has a portable frame provided with pickup device for gathering and delivering windrowed material on to a horizontal rearwardly moving belt conveyor. Cooperating with the horizontal conveyor is an endless belt assembly movable in a generally upright circular path and including a lower extensible section that is initially movable adjacent to and in the opposite direction of the horizontal conveyor so as to form with the horizontal conveyor a baling zone. As the bale within the baling zone increases in size, the extensible section is automatically and progressively extended about the bale, in response to such increase, against a predetermined tension or pressure constantly applied on the belt assembly. A completed bale is thus compact and of a uniform density over all portions thereof. After being formed the bale can be released in the field, or carried by the machine to a desired storage location.

6 Claims, 8 Drawing Figures

METHOD AND MACHINE FOR FORMING A LARGE ROUND BALE OF A FIBROUS MATERIAL

SUMMARY OF THE INVENTION

The invention provides a machine of a rugged and compact construction capable of gathering a windrowed fibrous material and delivering the same into a bale forming zone. The initial material is immediately rolled between a pair of coacting belt assemblies to form the center or core of the finished bale. In a supported and confined position on one belt assembly the core is rolled and progressively enlarged against the second belt assembly which is extensible under a constantly applied pressure or tension so as to continuously exert a uniform compacting force on the enlarging bale. The completed bale is readily released from the machine onto the ground by merely moving the second belt assembly to an open position relative to the first belt assembly, and then utilizing the first belt assembly as a discharge conveyor. The bale forming operation is continuous and efficient so as to appreciably reduce the time formerly required to bale hay. By virtue of the bale being continuously compacted during forming, a cylindrical bale of a uniform high density is provided capable of self-support and high resistance to weather deterioration. As a result of such compactness, the bale, after long standing in the field can be picked up for transport to a feeding location by a lift fork, grappling hook or the like.

DETAIL DESCRIPTION OF THE INVENTION

The round bale forming machine of this invention includes a portable frame 15 (FIG. 1) equipped with a pair of ground wheels 16 and a tongue structure 17 for connection in any suitable manner with the draw bar (not shown) of a usual farm tractor designated generally at 18. An endless conveyor unit 19 (FIGS. 1 and 3) movably supported on and extended longitudinally of the frame 15 includes a single continuous belt 21 of a width substantially equal to the width or transverse dimension of the frame 15. Projected forwardly of the frame 15 and below the tongue structure 17 is a pickup device 22 for gathering a windrowed fibrous material for delivery to the forward end 23 of the conveyor unit 19. The pickup device 22 is pivoted at 24 on the portable frame 15 for up and down pivotal movement of its front end into and out of a material pickup position.

Figure 3:
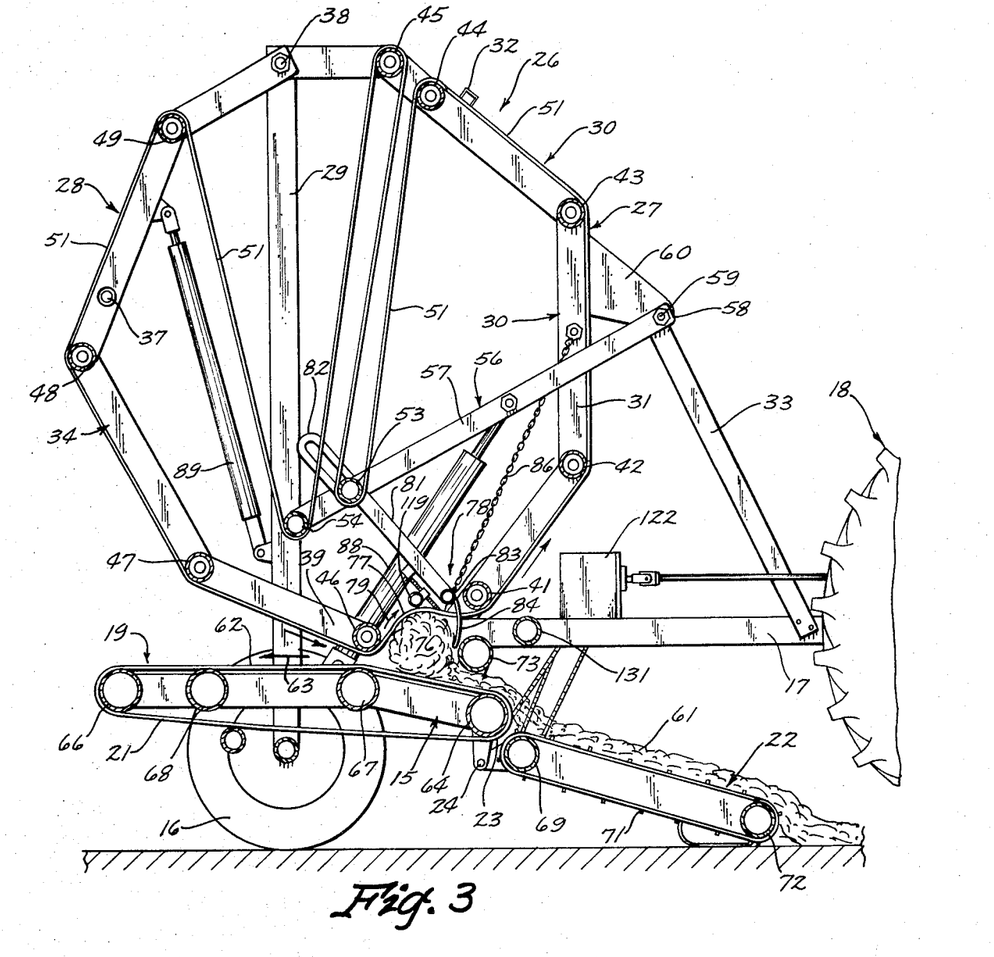
FIG. 3 is a longitudinal sectional view of the baling machine showing parts of the machine in their relative positions for initiating the forming of a bale.

Mounted on the frame 15 (FIG. 1) is an upright transversely extended cage structure, indicated generally as 26, that is comprised of a pair of upright frame sections 27 and 28 hereinafter referred to as a front stationary frame unit and a rear pivoted frame unit, respectively. The cage structure 26 (FIG. 3) is of a generally polygonal shape in transverse cross section with the frame units 27 and 28 relatively constructed to form mating half sections of the cage structure when the rear pivoted frame unit 28 is in its closed position relative to the front frame unit 27, as shown in FIG. 3.

The front stationary frame unit 27 (FIGS. 1 and 3) includes a pair of transversely opposite upright support members 29 secured at their lower ends to the frame 15. Corresponding to each upright support member 29 is a generally upright member 30 of a C-shape having an upright central section 31 spaced forwardly from and in a parallel relation with an associated upright support member 29. The upper terminal ends of the C-shape members 30 are rigidly secured to corresponding top portions of corresponding support members 29 and their lower terminal ends to transverse opposite portions of the frame 15. The front C-shape members 30 are interconnected by brace members 32 extended transversely of the frame 15. A common brace frame 33 connects the C-members 30 with the tongue structure 17.

The rear pivoted frame unit 28 includes a pair of upright C-shape end members 34 corresponding to and arranged in the vertical planes of the C-shape end members 30 of the front stationary frame 27. The C-members 34 are interconnected by transversely extended brace members indicated at 37. With the C-members 30 and 34 open to and facing each other the upper end of each C-member 34 is pivotally connected at 38 to the rear upper end of a corresponding front C-member 30. The C-members 34 are thus supported for pivotal movement about a common axis extended transversely of the frame 15 for pivotal movement of their lower ends 39 toward and away from a closing position with the front C-members 30.

Extended between and rotatably carried on the C-members 30 of the front stationary frame unit 27 are a series of transversely extended belt supporting rollers 41, 42, 43, 44 and 45. The roller 41 is positioned lowermost and the roller 45 uppermost and the remaining rollers 42, 43 and 44 are arranged in a spaced relation between the two end rollers 41 and 45.

Figures 1, 2:
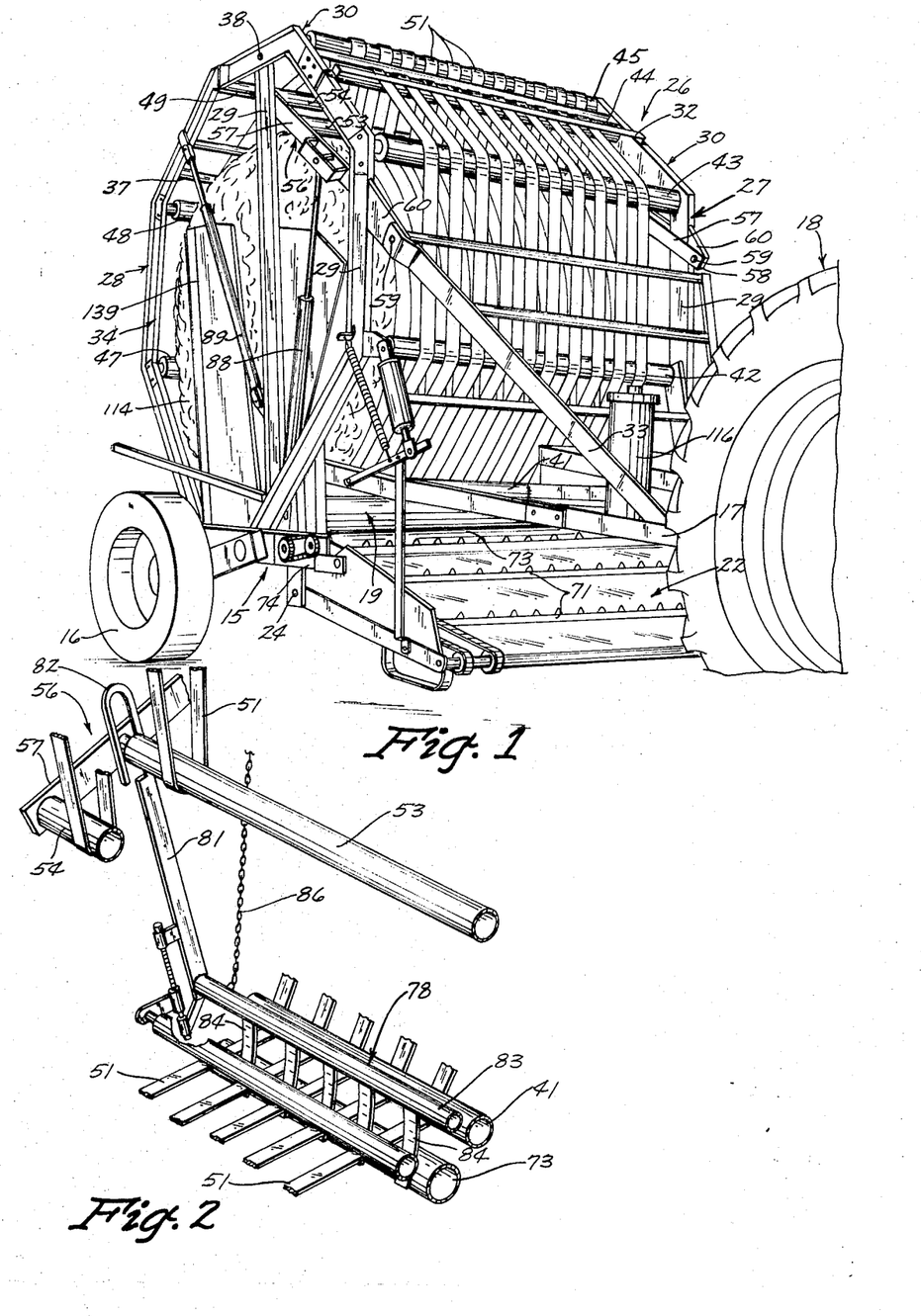
FIG. 1 is a front perspective view of the bale forming machine of this invention shown in assembly relation with the rear portion of a tractor.
FIG. 2 is a fragmentary detail perspective view of an enlarged belt tensioning unit having mounted thereon a gate assembly that forms part of a material confining means when a bale is being initially formed.
Figure 7:
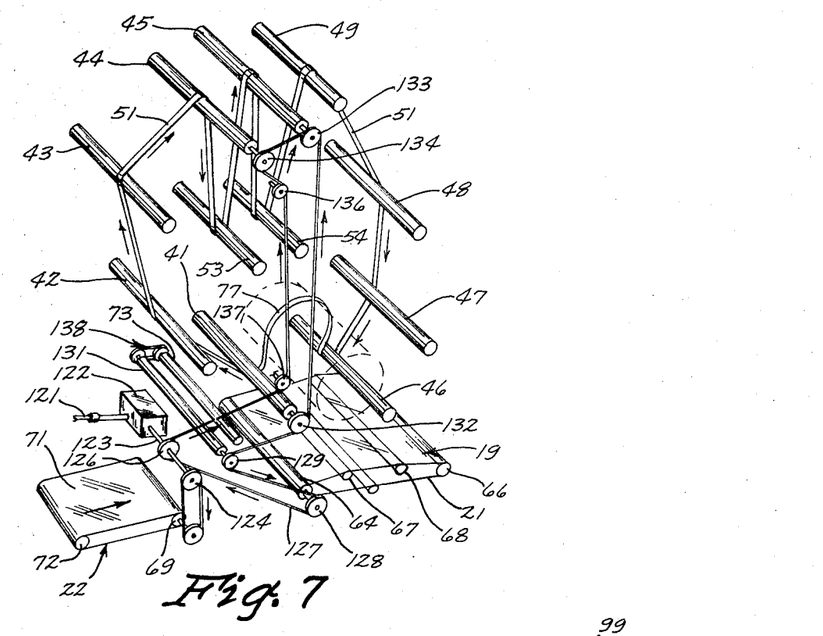
FIG. 7 is a diagrammatic perspective view of the power transmission system of the bale forming machine.

In a like manner the rear C-members 34 of the pivoted frame unit 28 are provided with rollers 46, 47, 48 and 49 with the roller 46 being at the lower end of the C-members 34, and the roller 49 adjacent the pivots 38 for the rear frame unit 28. As best shown in FIG. 1, a series of flat belts 51 are trained about all of the rollers on the cage structure 26 in a spaced relation longitudinally of the rollers. Each of the belts 51 is continuous and of a greater length than the circumferential length of the cage structure 26 when in its closed position. Referring to FIGS. 3 and 7, it is seen that the additional circumferential lengths or slack of the belts 51, indicated generally at 52, are traversible about a pair of rollers 53 and 54 that form part of a belt tensioning unit 56. The additional belt lengths hereinafter to be referred to as the belt slack 51, extend generally from the roller 44 about the rollers 53 and 45 and then to roller 54 for termination at the roller 49.

The rollers 53 and 54 of the belt tension unit 56 are carried on and extend between a pair of supporting arms 57 spaced transversely of the frame 15 with their forward ends 58 pivoted at 59 on plate supports 60 secured to and projected forwardly from corresponding central sections 31 of the front C-members 30. The arms 57 extend rearwardly from their pivots 59 for positioning of the free ends thereof within the cage structure 26. The rollers 53 and 54 are spaced longitudinally of the arms 57 at positions adjacent the free ends of the arms so that on pivotal movement of the arms the rollers 53 and 54 are moved toward and away from the rollers 44 and 49 for belt tensioning and bale forming purposes as will hereinafter appear.

In the initiation of a bale forming operation, and as the tractor is advanced, the windrowed material, indicated at 61 in FIG. 3 is picked up and moved rearwardly by the pickup device 22 for delivery to the front end 23 of the frame conveyor 19. The upper length 62 of the belt conveyor 21 moves in a rearward direction, as indicated by the arrow 63, and constitutes the top surface of the frame 15. The conveyor 19 has front and rear rollers 64 and 66, respectively, and intermediate rollers 67 and 68 operatively associated with the belt 21. The rollers 67 and 68 are arranged in a substantially horizontal plane and the front roller 64 is positioned below such plane so that the front section 23 of the conveyor 19 is inclined forwardly and downwardly from the roller 67 such that the front roller 64 is located adjacent the rear roller 69 of the pickup device 22. The pickup device 22 is of a usual type that includes a slat type conveyor 71 which is trained about a front roller 72 and the rear roller 69.

A feed roller 73 extends transversely of the frame 15 over the full width thereof and is located in a spaced relation between the front roller 64 of the conveyor 19 and the lowermost roller 41 on the front frame unit 27 so as to be positioned generally below the roller 41 and rearwardly and upwardly from the roller 64. The feed roller 73 is carried on a pair of transversely opposite mounting plates 74 projected upwardly from the conveyor frame 15 for attachment to the lower ends of corresponding front C-members 30. The feed roller 73 is rotatable in a clockwise direction as viewed in FIG. 3, so as to cooperate with the inclined forward conveyor section 23 in feeding material 61 between the belt 21 and feeder roll 73 and into a bailing zone, indicated generally at 76. With the rear pivoted frame unit 28 in its closed position relative to the front stationary frame unit 27, as shown in FIG. 3, the bale forming zone 76 is defined by the front conveyor section 23; those portions 77 of the belts 51 that are located between the rollers 41 and 46; a rear material confining means forward by the roller 46; and a front material confining means which includes the feed roller 73 and a gate assembly 78. The assembly 78 functions to close the space between the feed roller 73 and roller 41 so as to preclude any travel of material 61 between the rollers 41 and 73 by either the belts 51 or the feed roller 73, it being understood that the belt portions 77 at the baling zone 76 travel in the direction indicated by the arrows 79.

The gate assembly 78 (FIGS. 2 and 3) includes a pair of supporting arms 81 corresponding to the arms 57 of the belt tensioning unit 56. The supporting arms 81 are suspended from opposite ends of the roller 53 on elongated hooks 82 formed at the upper ends of the arms 81 and providing for a limited movement of a supporting arm 81 transversely of the roller 53. A tubular member 83 extends between and is connected to the lower ends of the supporting arms 81 in a parallel relation with the rollers 53 and 54. Spaced axially of the tube member 83 are a plurality of depending curved finger members 84 of a length, as shown in FIG. 3, to extend over and close the space between the rollers 41 and 73 at a position rearwardly of such rollers when the arms 57 of the belt tensioning unit 56 are in their lowermost pivotally moved positions. Referring to FIG. 2, it is seen that the spacing between the depending fingers 84 provides for the travel therebetween of the belts 51. The location of the fingers 84 to a closing position relative to the space between rollers 41 and 73 is defined by a pair of stop chains 86 each of which is connected at one end to the tube 83 and at an opposite or upper end to the central section 31 of the front C-members 30. The stop chains 86 limit the pivotal movement of the support arms 81 relative to the arms 57 of the belt tensioning unit 56, concurrently with actuating the support arm 81 transversely of the roller 53 when the arms 57 are being pivoted to their lowermost positions.

With the gate assembly 78 and rear pivoted frame unit 28 in their relative positions, shown in FIG. 3, the windrowed material 61, on being introduced into the bale forming zone 76 by feed roller 73, is concurrently acted upon by the relatively reversely moving conveyor belt 21 and belts 51. The joint action of the belts 21 and 51 provides for a clockwise rotational movement of the material 61 between the rollers 46 and gate assembly 78 to form what will be referred to as a core 87 for the bale to be formed. As the material 61 continues to be supplied into the bale forming zone 76 it acts similarly to a ribbon in being wound about the core 87 whereby to progressively increase the diameter of the core within the bale forming zone 76. To apply the material 61 uniformly over the length of the core 87, the tractor 18 may be steered laterally from one side to the other of the windrowed material. The progressive diametric enlargement of the core 87 takes place against a predetermined yieldable pressure applied against the belt portions 77 by the belt tensioning unit 56, concurrently with the application of a like yieldable pressure acting to restrain a free rearward pivotal movement of the rear frame unit 28.

Thus, as shown in FIG. 3, the arms 57 of the belt tensioning unit 56 are pivotally moved about their pivots 59 by a pair of hydraulic cylinder assemblies 88 and 88A, that are pivotally interconnected between the arms 57 and the conveyor frame 15. A second pair of hydraulic cylinder assemblies 89 and 89A, for moving the rear frame unit 28 about the pivots 38 are pivotally interconnected between corresponding upright supports 29 and rear C-shape members 34. The cylinder assemblies 88, 88A and 89, 89A are of double acting type, with the cylinders 88 and 88A fluid connected with corresponding cylinders 89 and 89A, respectively, in a common control system providing for a joint or separate operation of the cylinders 88 and 88A, relative to the cylinders 89 and 89A.

The tractor 15 is equipped with a usual hydraulic oil unit that includes a pump 91 (FIG. 8) operated from the tractor engine 92, an oil reservoir 93 and a control unit 94 that has oil supply and exhaust control valves 96 and 97, respectively. When the belt tensioning unit 56 and the rear pivoted frame 28 are to be moved to their relative positions, shown in FIG. 3, both of the valves 96 and 97 are open to provide for an oil flow indicated by dotted arrows. Thus, oil under pressure from the pump 91 is supplied from the control unit 94 into the line 98 and into lines 99 and 101. The oil admitted to line 99 retracts the pistons 102 and 103 corresponding to the cylinder assemblies 88A and 89A, respectively. Concurrently oil is exhausted from the cylinder assemblies 88A and 89A into the line 104 and oil exhaust line 106 to the control unit 94 for return to the reservoir 93 through the open oil exhaust valve 97. To retract the pistons 102 and 103 corresponding to the cylinder assemblies 88 and 89, respectively, oil under pressure from the line 98 is supplied to line 101 in which is connected a pressure relief valve 109. From the valve 109 the line 101 connects with a line 111 for admitting oil into the upper portions of the cylinder assemblies 88 and 89. Concurrently, oil from the lower portions of the cylinder assemblies 88 and 89 is exhausted into the line 106 for flow through the open exhaust valve 97 into the reservoir 93. When the cylinder assemblies 88, 88A and 89, 89A have been fully retracted the valves 96 and 97 of the control unit 94 are closed and then retained closed during a bale forming operation.

On enlargement of the bale core 87 within the bale forming zone 76 (FIG. 3) the core will tend to enlarge the zone 76 and in so doing exerts or applies pressure outwardly against the belt portions 77 which travel about the greater part of the peripheral surface of the forming bale. It is readily apparent that if a bale was permitted to be loosely formed the resultant bale would be of light density and of a fluffy consistency poorly adapted for field storage purposes. Stated otherwise, the finished bale would be of a relatively light weight relative to its size with characteristics similar to a pile of loosely stacked hay.

To provide a round bale that is compact and of a uniform high over-all density, the belt portions 77 are permitted to expand about the forming bale against the application of a predetermined continuous pressure provided by the cylinder assemblies 88, 88A and 89, 89A.

As mentioned above, when the rear frame unit 28 and belt tensioning unit 56 are located in their relative positions, shown in FIG. 3, the control valves 96 and 97 of the control unit 94 (FIG. 8) are both closed. Thus, in response to the enlargement of the bale core 87, tension increase effected in the slack portions 52 of the belts 51 acts to move the rollers 53 and 54 in an upward direction. The enlargement of the bale core 87 also acts to move the rollers 46 at the lower end of the rear frame unit 28 in a direction rearwardly and away from the feed roller 73 so as to pivot the rear frame unit 28 rearwardly about its pivots 38. The upward movement of the rollers 53 and 54 of the belt tensioning unit 56 is resisted by the cylinder assemblies 88 and 88A, concurrently with a resistance to the rearward pivotal movement of the rear frame unit 28 by the cylinder assemblies 89 and 89A.

Figure 8:
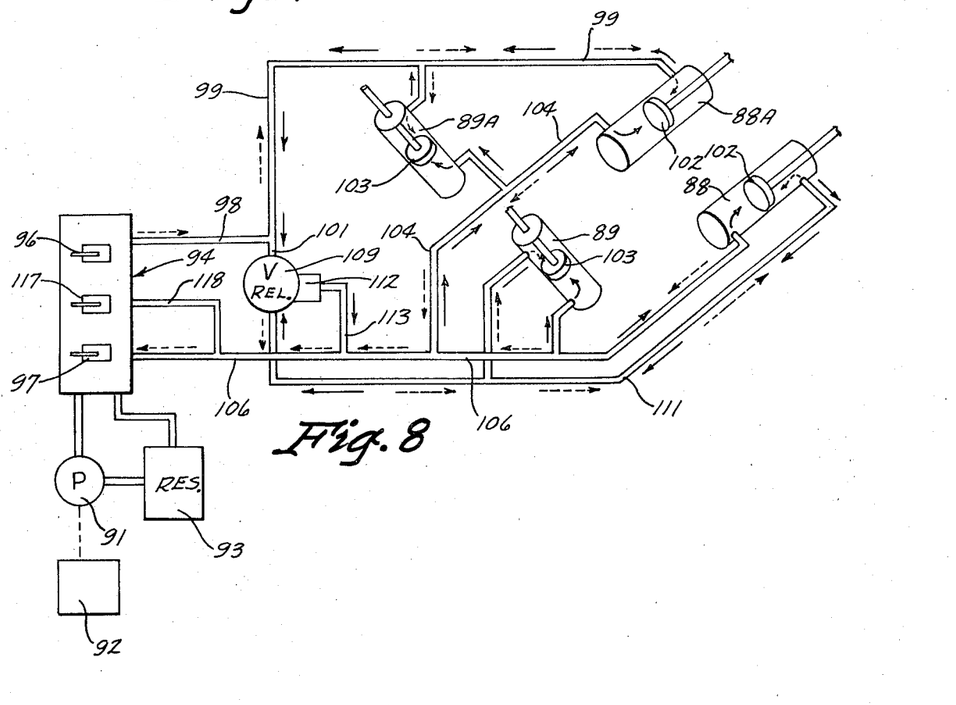
FIG. 8 illustrates diagrammatically the hydraulic control system for the belt supporting rollers and belt tensioning unit.

Referring to FIG. 8, it is seen that the upward movement of the rollers 53 and 54 of the belt tensioning unit 56 acts through the arms 57 to pull the pistons 102 in a direction upwardly in the cylinder assemblies 88 and 88A. Likewise, the rearward pivotal movement of the frame unit 28 acts to pull the pistons 103 upwardly in the cylinder assemblies 89 and 89A. Thus, with respect to the cylinders 88A and 89A, and as shown by full line arrows, the extension of their pistons 102 and 103, respectively, forces oil outwardly from the upper portions of cylinder assemblies 88A and 89A through the line 99 and into the line 101 for flow through the pressure regulating portion 112 of the pressure relief valve 109 and through line 113, closed exhaust line 106 and line 104 into the lower portions of the cylinder assemblies 88A and 89A.

In a similar manner, on extension of the pistons 102 and 103 for the cylinder assemblies 88 and 89, respectively, oil is forced outwardly from the upper portions of the cylinder assemblies 88 and 89 into line 111, and then into line 101 for travel through the pressure regulation portion 112 of the pressure relief valve 109 and into line 113 for return through line 104 into the lower portions of the cylinder assemblies 88 and 89, all as shown by full line arrows.

Figure 4:
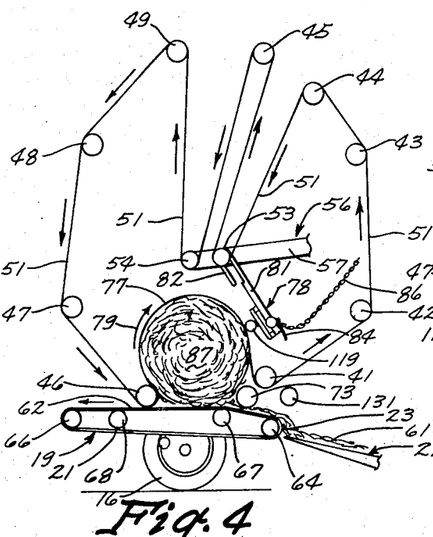
FIG. 4 is a diagrammatic illustration showing parts of the machine in their relative positions after the bale forming operation has been initiated.

It is seen, therefore, that the belt portions 77, in direct response to the progressive enlargement of the core 87, are progressively lengthened for progressive extension peripherally about the bale core 87 against the uniform resisting pressure applied on the belts 51 by the cylinder assemblies 88 and 88A. Concurrently with this progressive extension of the belt portions 77 the frame unit 28 is progressively pivoted rearwardly away from the front unit 27. In this connection, it is apparent that the belt slack 52 at the belt tension unit 56 is taken up in a direct relation with the lengthening of the belt portions 77 about the enlarging bale core 87. An enlarged baling zone 87 is shown in FIG. 4 for a partially formed bale or enlarged bale core 87, which is being rotated in a clockwise direction, in a supported position on the upper length 62 of the conveyor belt 21 confined between the rollers 46 and 73. The progressive enlargement of the baling zone 87 to accommodate the expansion of the round bale being formed continues until a bale of a desired size, indicated at 114 in FIG. 5, has been completed.

Figure 6:
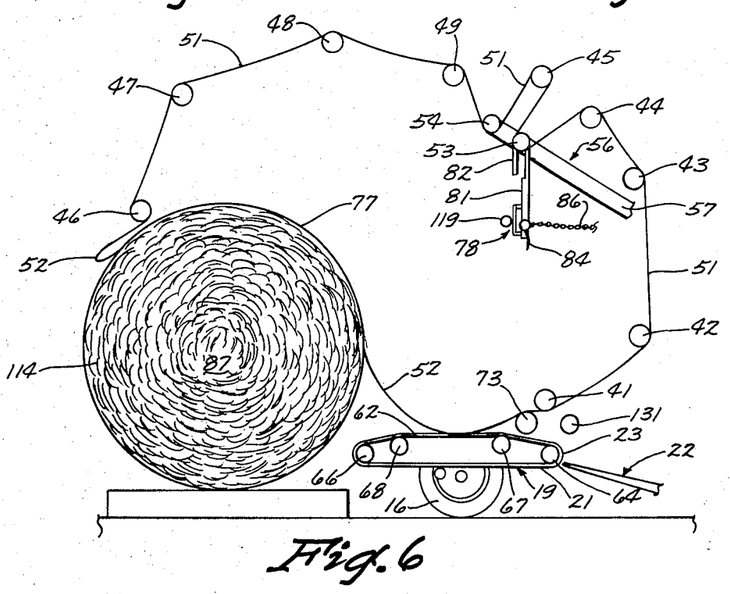
FIG. 6 is a diagrammatic illustration showing moved positions of the parts of the machine when the formed bale is to be released from the machine.

On completion of the bale, the tractor 18 is stopped and the conveyor 19 and belts 51 are continued in operation while a binding twine (not shown) stored in a magazine 116 (FIG. 1) is introduced in a suitable manner below the feed roll 73 and traversed axially of the formed bale 114. This axial traverse provides for the twine being wrapped about the periphery of the bale to reduce the tendency of the bale to unravel. With the twine wrapping operation completed, the conveyor 19 and belts 51 are stopped and the rear frame unit 28 is pivotally moved to the wide open position therefor relative to the front frame unit 27, as shown in FIG. 6, to move the roller 46 in a clearance relation with the bale 114. This is accomplished by retaining the control valves 96 and 97 closed and opening a normally closed valve 117 (FIG. 8) of the control unit 94. Oil under pressure from the pump 91 is then introduced through the oil line 118 and into the closed exhaust line 106 for travel into the lower portions of the cylinder assemblies 88, 88A and 89, 89A. Since the cylinder assemblies 88 and 88A are of a shorter stroke than the cylinder assemblies 89 and 89A, and with pressure regulating portion 112 of the pressure relief valve 109 acting as a stop valve, the pistons 103 are extended to their outermost positions, defining the wide open position of the rear frame unit 28. The valve 117 is then closed and the conveyor 19 again operated to provide for the completed bale 114 being discharged from the rear end of the conveyor to a ground supported storage position.

It is apparent, of course, that the completed bale 114 can be released at any desired storage location. Thus, after the twine wrapping operation has been completed the belts 51 and conveyor 19 may be rendered inoperative and the pickup device 22 pivoted upwardly out of a window gathering position. The baling machine then functions as a trailer or transport apparatus for the completed bale and can be towed by the tractor 18 to a desired storage position. To facilitate the ground release of the bale from the conveyor 19, the rear roller 66 of such conveyor (FIG. 3) may be pivotally supported relative to the axis of the roller 68 so as to be adjustable to a downwardly and rearwardly inclined position during a bale releasing operation.

As hereinabove described, the gate assembly 78 for closing the space between the feed roller 73 and the belt roller 41 on the front frame unit 27, is supported from the roller 53 of the belt tensioning unit 56. On completion of its function to confine the windrowed material 61 within the bale forming zone 76 in the initial forming of the bale core 87, the gate assembly 78 serves no further function in the bale forming operation. As best shown in FIG. 2, the gate assembly 78 includes a roller 119 adjustably supported from the depending arms 81 in a parallel relation with the finger supporting tube 83. This roller 119 (FIG. 3) is located rearwardly of the tubular member 83 and upwardly from the lower ends of the depending arms 81 to provide for the rolling engagement thereof on the belt portions 77 during the enlargement of the bale core 87.

Figure 5:
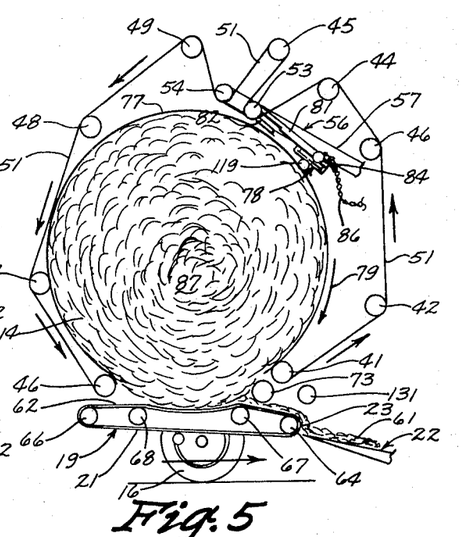
FIG. 5 is illustrated similarly to FIG. 4 and shows the parts in their relative positions when the bale is formed.

Thus, as the size of the bale core 87 increases, the gate assembly 78 is pivotally moved upwardly and forwardly by the riding engagement of the roller 119 on the belt portions 77 at the front side of the enlarging core 83, as illustrated in FIG. 4. This pivotal movement takes place concurrently with a downward movement of the gate assembly 78 relative to the roller 53 to a supported position on the elongated hook members 82. When the bale 114 has been completed, and as shown in FIG. 5, the gate assembly 78 has the arms 81 thereof extended longitudinally of the arms 57 of the belt tension unit 56 at a position outwardly of the bale. On a release of the bale 114 from the machine (FIG. 6) the gate assembly 78 merely drops to a vertically dependent position from the roller 53 so that on a later actuation of the belt tensioning unit 56 to its position shown in FIG. 3, the gate assembly 78 is automatically moved to its closed position relative to the space between the feed roller 73 and the belt roller 41.

The belts 51, conveyor 19 and pickup device 22 are all operated from a power take-off 121 of the tractor 18 through a power transmission system illustrated diagrammatically in FIG. 7. The power take-off is connected to a gear unit 122 having an output or drive shaft 123. A first gear 124 mounted on the drive shaft 123 is in a direct drive relation with the drive roll 69 of the pickup device 22. A second gear 126 on the drive shaft 123 is associated with a continuous chain 127 which in succession from the gear 126 is trained about a gear 128 mounted on the front drive roller 64 of the conveyor 19, a gear 129 carried on a press or directing roll 131, gears 132, 133 and 134 for the rollers 41, 45 and 44, respectively, and then about idler gears 136 and 137 back to the drive gear 126.

The feed roll 73 is driven directly from the press roller 131 through a gear and chain assembly 138. The roll 131 (FIGS. 3 and 7) is spaced upwardly and forwardly from the feed roller 73 and functions to direct the windrowed material 61 for travel between the feed roll 73 and the belt 21 of the conveyor 19. In order to accommodate various thicknesses of the material 61 being delivered by the pickup device 22 to the conveyor 19, the feed roller 73 may be pivotally supported on the axis of the press roller 131 and yieldably biased in a downward direction toward the conveyor belt 21.

The bale forming machine 15 is thus seen to be of a compact and rugged construction and efficient in operation to form a large round bale in one continuous operation and, on completion of such operation, to function as a transport for moving the bale to a desired storage position in the field. The bales are of a uniform compact density and firmly formed so as to appreciably reduce any tendency of the bale to disintegrate or fall apart in the field over substantial periods of time. The bales may be rolled into a size having a diameter of about seven feet, with an over-all length of about six feet and a weight of approximately twenty-two hundred pounds. Upright side plates 139 mounted on the frame 15 and secured to the inner surfaces of the upright supports 29 define the bale ends by confining the material 61 therebetween. The end surfaces of the bale 114 are thus flat and solid over their complete areas.

Although the invention has been described with respect to a preferred form thereof, it is to be understood that it is not to be so limited since changes can be made therein which are within the full intended scope of this invention as defined by the appended claims.

I claim:

1. A machine for forming a round bale of windrowed fibrous material comprising:
   a. a portable frame,
   b. a first continuous belt movably supported on said frame for movement longitudinally thereof and including a linear upper run;
   c. a series of continuous belts movably supported on said frame above said first belt for travel longitudinally and vertically relative to said frame, said series of belts having lower runs adjacent the upper run of said first belt, d. means on said frame for picking up and delivering a windrowed fibrous material to one end of the upper run of said first belt for travel between said upper run and lower runs, e. means on said frame for confining the delivered material between selected opposite portions of said upper run and lower runs, f. means for moving said upper run of the first belt in a direction opposite to the direction of movement of the lower runs of said series of belts whereby the material confined between said upper run and lower runs is rotated to form a round bale, g. means for yieldably extending and retracting said lower runs of the series of belts to provide for the travel of said lower runs about the upper peripheral section of a bale being formed in response to the progressive diametrical enlargement of said bale, h. a first roller extended transversely of and adjacent to the upper run of said first belt, i. means supporting said first roller on the frame for movement longitudinally of the upper run of said first belt, j. a second roller extended transversely of and adjacent to the upper run of said first belt at a position between said first roller and said pickup means, and k. a third roller transversely of said first belt at a position spaced vertically above and adjacent said second roller, said series of belts having the lower runs thereof trained about the lower portions of said first roller and said third roller, said second roller coacting with the upper run of said first belt to feed material therebetween toward said first roller, and l. said confining means including said first and second rollers which cooperate to hold the bale being formed against movement longitudinally of said upper run.

2. A machine for forming a round bale of windrowed fibrous material comprising:

a. a portable frame, b. a first continuous belt movably supported on said frame for movement longitudinally thereof and including a linear upper run;

c. a series of continuous belts movably supported on said frame above said first belt for travel longitudinally and vertically relative to said frame, said series of belts having lower runs adjacent the upper run of said first belt.

d. means on said frame for picking up and delivering a windrowed fibrous material to one end of the upper run of said first belt for travel between said upper run and lower runs, e. means on said frame for confining the delivered material between selected opposite portions of said upper run and lower runs, f. means for moving said upper run of the first belt in a direction opposite to the direction of movement of the lower runs of said series of belts whereby the material confined between said upper run and lower runs is rotated to form a round bale, g. means for yieldably extending and retracting said lower runs of the second belts to provide for the travel of said lower runs about the upper peripheral section of a bale being formed in response to the progressive diametrical enlargement of said bale, h. said extending and retracting means including a belt tension unit engageable with the upper runs of said series of belts and movably supported on said frame for up and down movement toward and away from the upper run of said first belt, said tension unit being in a lower position therefor when a bale forming operation is initiated and in an upper position therefor when the bale forming operation has been completed, and i. said confining means including a gate assembly extended transversely of said first belt and said series of belts and supported on said tension unit for up and down movement therewith, j. said gate assembly, when a bale is to be formed, located in a closed position extended transversely of and adjacent one end of the lower runs of said series of belts to hold material engaged by said lower runs being moved outwardly from between said lower runs and the upper run of said first belt in a direction toward said material pickup means.

3. A machine for forming a round bale of windrowed fibrous material comprising:

a. a portable frame, b. a first continuous belt movably supported on said frame for movement longitudinally thereof and including a linear upper run;

c. a series of continuous belts movably supported on said frame above said first belt for travel longitudinally and vertically relative to said frame, said series of belts having lower runs adjacent the upper run of said first belt, d. means on said frame for picking up and delivering a windrowed fibrous material to one end of the upper run of said first belt for travel between said upper run and lower runs, e. means on said frame for confining the delivered material between selected opposite portions of said upper run and lower runs, f. means for moving said upper run of the first belt in a direction opposite to the direction of movement of the lower runs of said series of belts whereby the material confined between said upper run and lower runs is rotated to form a round bale, g. means for yieldably extending and retracting said lower runs of the second belts to provide for the travel of said lower runs about the upper peripheral section of a bale being formed in response to the progressive diametrical enlargement of said bale, h. said extruding and retracting means including a belt tension unit engageable with the upper runs of said series of belts and movably supported on said frame for up and down movement toward and away on from the upper run of said first belt, said tension unit being in a lower position therefor when a bale forming operation is initiated and in an upper position therefor when the bale forming operation has been completed, i. said tension unit including an arm means pivoted on and extended longitudinally of said frame, j. a roller adjacent the free end of said arm means extended transversely of and engageable with the upper runs of said series of belts, and k. a hydraulic cylinder assembly interconnected with said frame and said arm means for pivotally moving said arm means, l. said extending and retracting means including said cylinder assembly.

4. A machine for forming a round bale of a windrowed fibrous material comprising:

a. a portable frame, b. means at one end of said frame for picking up the windrowed fibrous material, c. a conveyor means on said frame for receiving material from said pickup means for movement toward the other end of said frame, d. a frame assembly including a pair of upright frame structures extended transversely of and above said conveyor means, e. means rigidly mounting a first one of said frame structures on said portable frame at said one end thereof, f. means pivotally connecting together the upper ends of said two frame structures for pivotal movement of the second one of said frame structures to open and closed positions relative to said first frame structure, said frame structures relatively constructed such that when said second frame structure is pivotally moved to the closed position therefor said frame assembly is of a generally polygonal shape in side elevation, g. a plurality of continuous belts rotatably supported for movement about said frame assembly, said belts spaced transversely of said conveyor means and each of said belts having the lowermost portion thereof adjacent said conveyor means when the second frame structure is in the closed position therefor, h. a roller corresponding to and mounted at the lower end of each frame structure, said pair of rollers extended transversely of and adjacent to said conveyor means, and defining the lowermost portions of said belts, said belts engageable with the lower portions of said rollers, i. a third roller on said portable frame cooperating with said conveyor means to move material therebetween to a baling zone located between said pair of rollers and below the lowermost portions of said belts, said conveyor means movable in a direction opposite to the direction of movement of said belt lowermost portions to provide for the material moved into said baling zone being rotated to form a bale, and j. means providing for the expansion of said lowermost belt portions upwardly away from said conveyor means in response to the enlargement of the bale in said baling zone.

5. A machine for forming a round bale of a windrowed fibrous material comprising:

a. a portable frame, b. a conveyor means mounted on and extended longitudinally of said portable frame and constituting a movable upper surface for said portable frame, c. means on said frame for picking up and delivering the windrowed fibrous material onto said upper surface, d. a pair of longitudinally spaced rollers on said frame extended transversely of and adjacent to said upper surface to define therebetween a bale forming zone, e. means supporting a first one of said rollers on said frame for movement longitudinally of said upper surface toward and away from the second one of said rollers, f. a series of belts supported on said portable frame for travel in an upright plane extended longitudinally of the frame, said belts having lower portions trained about the lower portions of said pair of rollers with the material from said pickup means moved by said movable upper surface into said bale forming zone, g. means for moving the lower portions of said series of belts in a direction opposite to the direction of movement of said movable upper surface whereby material in said baling zone is rotated between said lower belt portions and the movable upper surface to form a rounded bale, h. means for extending said lower belt portions upwardly between said pair of rollers for travel in engagement with and about the upper peripheral portion of a bale being formed concurrently with the movement of said first roller away from said second roller, i. a third roller mounted on said frame in a parallel relation with and below said second roller in a coacting relation with said movable upper surface to feed material to said baling zone, and j. gate means movably supported on said frame for movement to a closed position adjacent to said second and third rollers to prevent the passage of material outwardly from said baling zone between said second and third rollers, when the forming of a bale is initiated.

6. The machine for forming a round bale according to claim 5, wherein:

a. said gate means in the closed position therefor is within said baling zone and extended transversely of said conveyor means between the axes of said second and third rollers.

* * * * *